United States Patent [19]

Kato

[11] Patent Number: 5,176,420
[45] Date of Patent: Jan. 5, 1993

[54] MOLDING FOR FRONT GLASS FOR VEHICLE

[75] Inventor: Katsuhisa Kato, Kitasouma, Japan

[73] Assignees: Tokiwa Chemical Industries Co., Ltd., Chiba; System Technical Co., Ltd., Ibaragi, both of Japan

[21] Appl. No.: 846,980

[22] Filed: Mar. 9, 1992

Related U.S. Application Data

[63] Continuation of Ser. No. 632,486, Dec. 24, 1990, abandoned.

[30] Foreign Application Priority Data

Dec. 25, 1989 [JP] Japan ............... 1-149551[U]

[51] Int. Cl.⁵ ............................................. B60J 10/02
[52] U.S. Cl. .................................... 296/93; 52/397
[58] Field of Search .................. 296/93; 52/397, 400, 52/402, 403, 208

[56] References Cited

U.S. PATENT DOCUMENTS

| | | | |
|---|---|---|---|
| 4,139,971 | 2/1979 | Kimura | 52/208 |
| 4,168,858 | 9/1979 | Inamoto | 296/93 |
| 4,251,101 | 2/1981 | Aotani | 296/93 |
| 4,349,993 | 9/1982 | Tanaka et al. | 52/208 |
| 4,757,659 | 7/1988 | Miyakawa et al. | |
| 4,757,660 | 7/1988 | Miyakawa et al. | |
| 4,840,001 | 6/1989 | Kimisawa | 296/93 X |
| 4,950,019 | 8/1990 | Gross | 52/208 X |

FOREIGN PATENT DOCUMENTS

| | | | |
|---|---|---|---|
| 135823 | 6/1986 | Japan | 296/93 |
| 282116 | 12/1986 | Japan | 296/93 |
| 8018 | 1/1988 | Japan | 296/93 |
| 178017 | 7/1989 | Japan | 296/93 |
| 3522 | 1/1990 | Japan | 296/93 |
| 2219338 | 12/1989 | United Kingdom | 296/93 |

Primary Examiner—Charles A. Marmor
Assistant Examiner—Gary C. Hoge
Attorney, Agent, or Firm—Wenderoth, Lind & Ponack

[57] ABSTRACT

A molding body interposed between a body panel and a glass panel to prevent stain caused by friction between the abutting portions of the molding body and the body panel includes a main molding, a auxiliary molding, and a holder. The holder has an abutting face for attachment to the body panel and an engaging piece for engaging to a lower engaging portion of the main molding. The holder is attached to the body panel, the main molding is engaged with the holder at the left and right side sections of the molding, and the glass panel is fixed by the auxiliary molding inserted between a head and the upper engaging portion of the main molding. At the upper section of the molding the glass panel is fixed to the lower face of the head of the main molding without using the auxiliary molding. The holder can be formed as a continuous piece or as a number of discrete holder sections.

11 Claims, 7 Drawing Sheets

MOLDING FOR FRONT GLASS FOR VEHICLE

This application is a continuation of now abandoned application Ser. No. 07/632,486, filed on Dec. 24, 1990, now abandoned.

BACKGROUND OF THE INVENTION

This invention relates to a molding for front glass interposed between a body panel and a glass panel of various vehicles, and more particularly to a molding for front glass for vehicles to prevent creation of stain due to peeling of paint caused by friction between the molding and the body panel.

Conventionally, as disclosed in U.S. Pat. Nos. 4,757,659 and 4,757,660, it is known that a molding is fixed on an outer periphery of a glass panel and then is directly adhered with an adhesive onto the body panel such that the molding becomes fixed.

With the known molding, friction is always present at a junction between the molding and the body panel due to the vibration and rocking created during the running of vehicle, thereby causing paint to be peeled from the body panel, such that the exposed portions of the body panel become stained by rain and wind.

A main object of the invention is to provide a molding for front glass wherein a holder is interposed between the molding and the body panel to overcome the above-mentioned problems of the prior art, and wherein a molding is engaged with the holder pre-fixed at the frictional portion of the body panel so as to fix the molding against vibration created during running of the vehicle so that friction is not produced between the body panel and the molding.

Another object of this invention is to provide the molding for front glass wherein the holder comprises a plurality of discrete holder sections which are attached in spaced apart relation along the wall forming an opening of the body panel so that the molding can be strongly fixed by engaging the holder sections with the main molding, and which can be produced economically and with a very pleasing external appearance.

According to this invention, the front glass molding comprises a molding body including a main molding, an auxiliary molding and a holder. The main molding is provided with a head, a leg projected downwardly from the head, an upper engaging portion and a lower engaging portion formed respectively on said leg. The auxiliary molding has an inserting projection for inserting between the head and the upper engaging portion of the main molding, and the holder is provided with an engaging piece for engaging with the lower engaging portion of the main molding and with an abutting face for attaching onto the wall of the body panel. The holder is fixed onto the wall of the body panel, the lower engaging portion of the main molding is engaged with an engaging piece of the holder, a glass panel is fixed at left and right side sections of the molding by the auxiliary molding inserted onto the main molding, and the glass panel is fixed at an upper section of the molding onto a lower face of the head of the main molding without using the auxiliary molding.

The holder of the front glass molding according to this invention can comprise a continuous elongated piece made of a synthetic resin and extending along a full periphery of the molding including the left and right side sections and the upper section. The holder is provided at its upper end with a contacting tongue extending along a top of the wall of the chassis panel, and at its lower end with a bend adjusting portion which is bendable or can be cut to conform to the height of the body panel wall. The holder is also provided at its one side face with an engaging piece for engaging with the lower engaging portion of the main molding, and at another side face with an abutting face for attachment to the body panel wall.

In the modification of the front glass molding according to this invention, the holder can comprise a plurality of discrete holder sections which are fixed in spaced apart relation or contiguously along the wall of the body panel. Each of the holder sections is provided at its one side face with an engaging piece for engaging with the lower engaging portion of the main molding, and at its other side face with an abutting face for attachment to the wall of the body panel.

BRIEF DESCRIPTION OF THE ACCOMPANYING DRAWINGS

The invention is illustrated by way of example in the accompanying drawings in which.

DETAILED DESCRIPTION OF THE PREFERRED EMBODIMENTS

The present invention will be now described with reference to the accompanying drawings and more particularly, to FIG. 2 to FIG. 9 wherein a first embodiment of the molding for a front glass according to this invention is illustrated.

Figure 2:
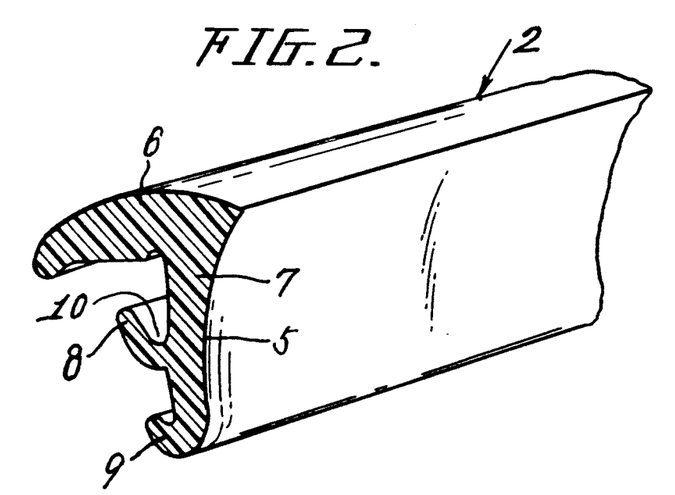
FIG. 2 is a perspective view of a main molding of a first embodiment of the front glass molding of the invention.

A molding body 1, interposed between a body panel 20 and a glass panel 19 in a vehicle 25, comprises an elongated main molding 2 formed by extrusion of synthetic resin and extending continuously along side and upper portions of the periphery of the glass panel, an auxiliary molding 3, with a rain outlet, fixed to the glass panel 19, and a holder pre-attached to the body panel 20. The main molding 2 is provided with a head 6, which has a longitudinally extending exposed upper surface, and with an insertion leg 7 inserted in a gap between the glass panel 19 and the body panel 20. Formed on a first side face of the leg 7 is adhesion surface 5 and on a second side face of the leg 7 is an upper engaging portion 8 extending downwardly from the head 6. A concave insertion recess 10 is formed between a lower face of the head 6 and the upper engaging portion 8, and a lowering engaging portion 9 extending downwardly from the upper engaging portion 8 is formed at a lower end of the leg 7.

Figure 5:
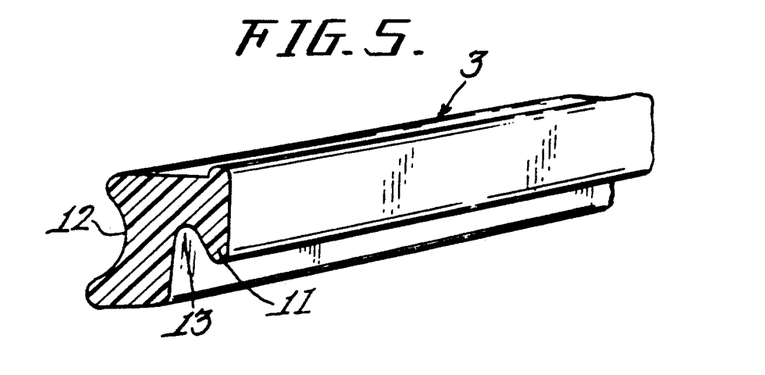
FIG. 5 is a perspective view of an auxiliary molding of the first embodiment.

At one side face, the auxiliary molding 3 has an insertion projection 11 engaged in the concave insertion recess 10 of the main molding along the longitudinal direction, as shown in FIG. 5; and at another side face, the auxiliary molding 3 has an outlet channel 12 for water drainage. Formed on the auxiliary molding 3 is an engaging dent 13, adjacent to the insertion projection 11, into which the upper engaging portion 8 of the main molding 2 is inserted.

Figure 3:
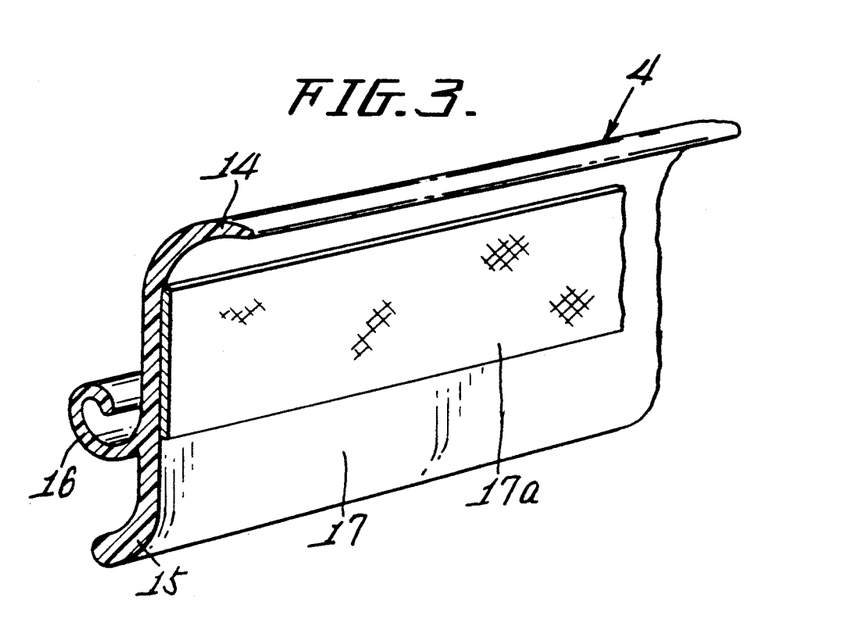
FIG. 3 is a perspective view of a holder of the first embodiment.
Figure 4:
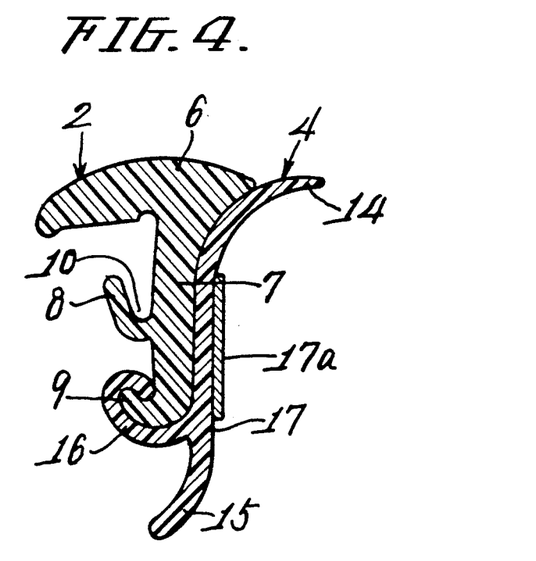
FIG. 4 is a cross section view showing an assembled condition of the main molding and holder of the first embodiment.

In addition, a holder 4 is provided and has a contacting tongue 14 at its upper end, and a bend adjusting portion 15 at its lower end. The holder 4 is provided at one side face with an engaging piece 16 to engage with the lower engaging portion 9 of the main molding 2, and at another side face with an abutting face 17 for attachment onto a wall 24 forming an opening of the body panel 20. An adhesion tape 17a is mounted to the abutting face 17, and can thereby be mounted as necessary.

Figure 1:
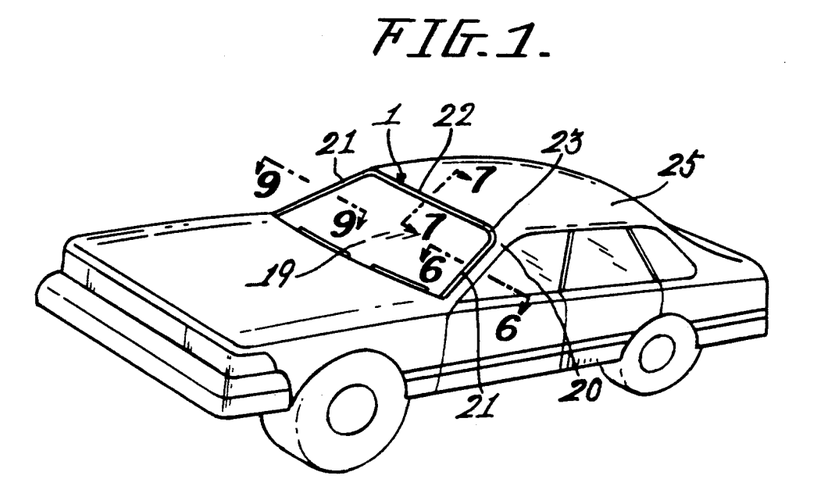
FIG. 1 is a perspective view of a vehicle in which a front glass molding of this invention is mounted.
Figure 6:
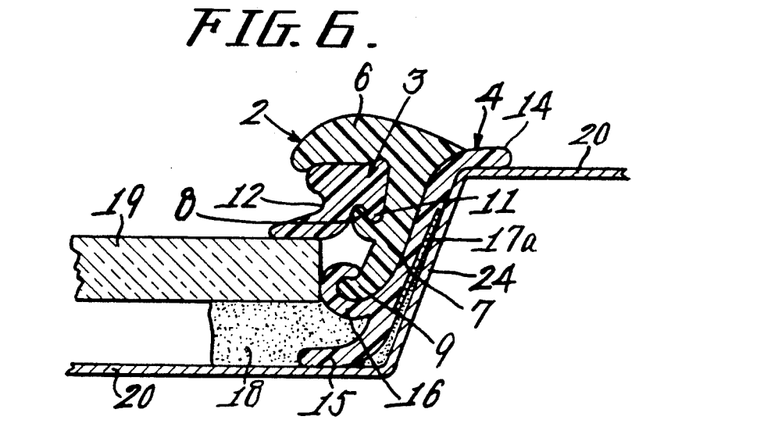
FIG. 6 is a vertical cross-sectional side view of the molding of the first embodiment, taken along line 6—6 in FIG. 1.
Figure 7:
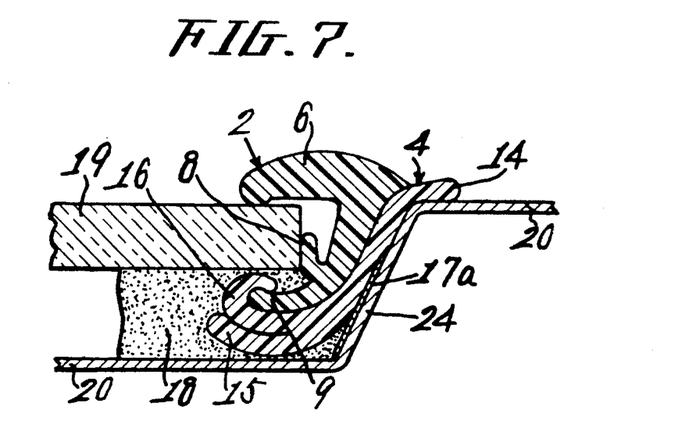
FIG. 7 is a vertical cross-sectional side view of an upper center section of the molding of the first embodiment, taken along line 7—7 in FIG. 1.

As shown in FIG. 1, in order to fix the molding body 1 between the glass panel 19 of the front of the vehicle 25 and the body panel 20 with an adhesive 18, the abutting face 17 of the holder 4 is first attached to the wall 24 of the body panel 20 with the adhesion tape 17a, and then the lower engaging portion 9 at lower end of the main molding 2 is engaged with the engaging piece 16 of the holder 4, so as to attach the main molding 2 to the holder 4. Then, at left and right side sections 21, 21 of the molding, the engaging projection 11 of the auxiliary molding 3 is engaged with the upper engaging portion 8 of the main molding 2 as shown in FIG. 6 and the glass panel 19 is fixed by the auxiliary molding 3 engaged with the main molding 2. As can be seen from FIGS. 1 and 7, at an upper section 22 of the molding between corner sections 23, 23 of the molding, an end of the glass panel 19 is held by the lower face of the head 6 of the main molding 2 and is fixed to the main molding 2 attached to the holder 4 without using the auxiliary molding 3.

Figure 8:
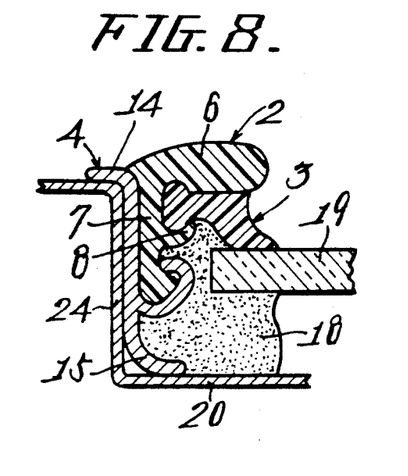
FIG. 8 is a vertical cross-sectional side view of the side section of the molding of the first embodiment, taken along line 8—8 in FIG. 1, showing an example applicable to a perpendicular wall forming an opening of a body panel to which the glass panel is attached.
Figure 9:
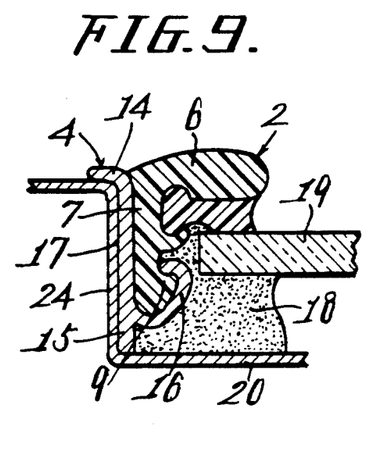
FIG. 9 is a vertical cross-sectional side view of the side section of the molding of the first embodiment, also taken along line 8—8 in FIG. 1, but showing an example a bent adjusting portion is cut away when the height of the perpendicular wall is small.

The molding body 1 in this embodiment is applicable to a vehicle in which the opening of the body panel 20 is formed by a perpendicular wall as shown in FIGS. 8 and 9. In this situation, the adhesion face 17 of the holder 4 is adhered to the perpendicular wall 24 of the body panel 20, the lower engaging portion 9 of the main molding 2 is engaged with the engaging piece 16 of the holder 4 to attach the main molding 2 to the fixture holding piece 4, and at the left and right side sections 21, 21 of the molding, the engaging projection 11 of the auxiliary molding 3 is engaged with the concave insertion recess 10 of the main molding 2. In this manner, the glass panel 19 is fixed by the auxiliary molding 3, and the molding body 1 is fixed and adhered by adhesive 18. When the height of the perpendicular wall 24 is small, the bend adjusting piece 15 of the holder 4 is cut away so that the abutting face 17 of the holder 4 is attached to and in parallel with the perpendicular wall 24 (see FIG. 9).

The molding body 1 in the above-mentioned embodiment prevented peeling of paint caused by friction between the abutting faces of the body panel 20 and the main molding 2 by interposing the holder 4 between the chassis panel 20 and the main molding 2. In addition, the contacting tongue 14 of the holder 4 is surely attached to the bend on the top of the body panel 20, and the bend adjusting piece 15 at the lower end of the holder 4 is bendable or cuttable according to the height size and slant of the wall 24 of the body panel 20. As the adhesive tape 17a is provided on one side face of the holder 4, it is securely adhered to the body panel 20. The engaging piece 16 at the other side face of the holder 4 is also securely engaged with the lower engaging portion 9 of the main molding 2, and the adhesion surface 5 directly abuts the other side face of the holder 4 along the entire length of adhesion surface 5 which faces holder 4, such that the main molding 2 and the holder 4 are securely fixed to the body panel 20. In addition, as the main molding 2 and the holder 4 are formed of synthetic resin, no stain is created as with metal, and both are securely adhered.

Figure 10:
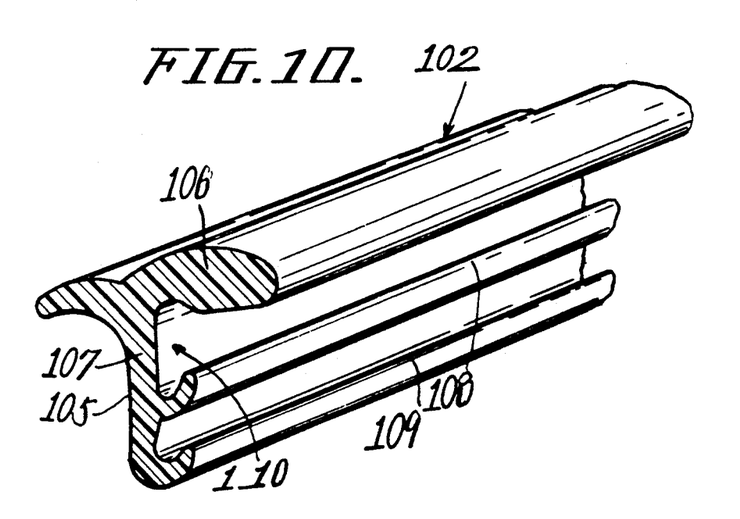
FIG. 10 is a perspective view of a main molding of a second embodiment of the front glass molding of the invention.
Figure 11:
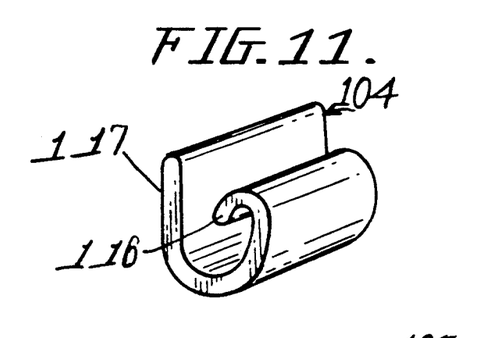
FIG. 11 is a perspective view of a holder of the second embodiment.
Figure 12:
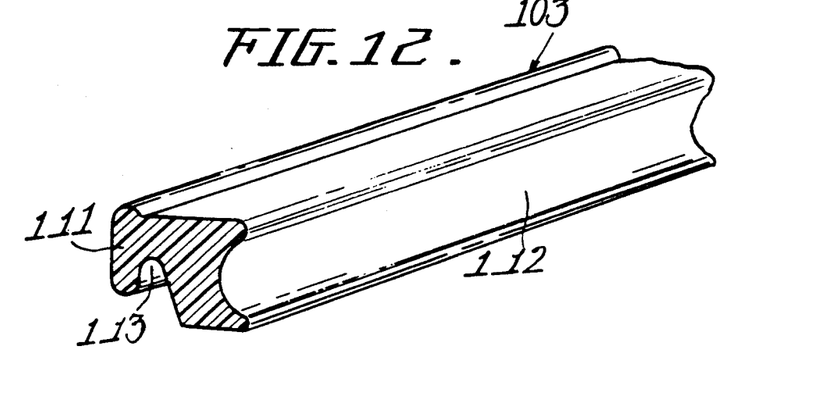
FIG. 12 is a perspective view of an auxiliary molding of the second embodiment.

A molding body 101, according to a second embodiment shown in FIG. 10-18, comprises a main molding 102, an auxiliary molding 103 and a holder 104 in the same manner as the first embodiment shown in FIGS. 1-9. The main molding 102 has a head 106, an inserting leg 107, an abutting surface 105, an upper engaging portion 108, a lower engaging portion 109 and a concave insertion recess 110 as shown in FIG. 10. The auxiliary molding 108 has an engaging dent 113, an insertion projection 111 and an outlet channel 112 for water drainage, as shown in FIG. 12.

Figure 15:
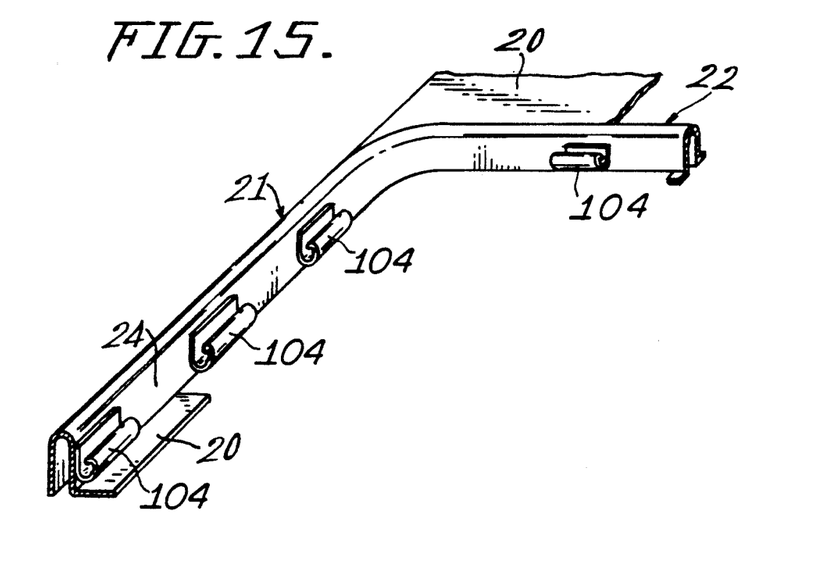
FIG. 15 is a perspective view showing the holder of the second embodiment attached to the perpendicular wall forming an opening of the body panel.

The holder 104 of this second embodiment does not comprise a continuous piece extending along a full outer periphery of the left and right side sections 21, 21 and the upper section 22 of the molding as the first embodiment, but rather comprises a plurality of discrete holder sections as shown in FIG. 11. Each holder section has, at one side face, an abutting face 117 to be fixed to the wall 24 forming the opening of the body panel 20. An engaging piece 116 is projected from another side face of the holder 104 to engage with the lower engaging portion 109 of the main molding 102. This holder 104 is formed by the plurality of spaced apart holder sections attached on the wall 24 forming the opening of the body panel 20, as shown in FIG. 15. However, if necessary, the discrete holder sections can be mounted so as to be aligned in a row adjacent one another. Further, the holder sections can be mounted to the upper or lower portion of wall 24 corresponding to height of the opening wall 24 and can be slanted relative thereto (see FIGS. 16-18).

Figure 13:
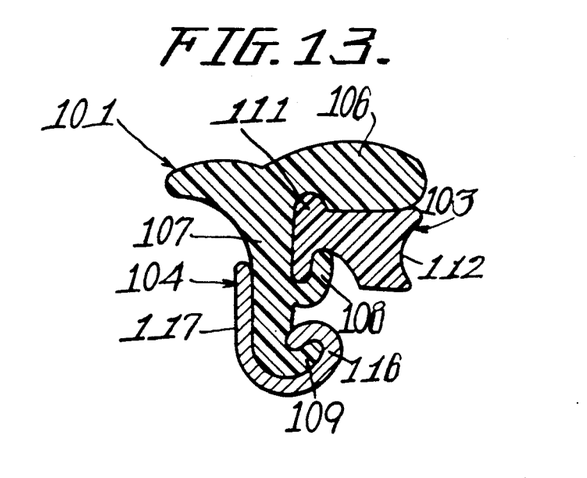
FIG. 13 is a cross section view showing an assembled condition of a molding body of the second embodiment.
Figure 14:
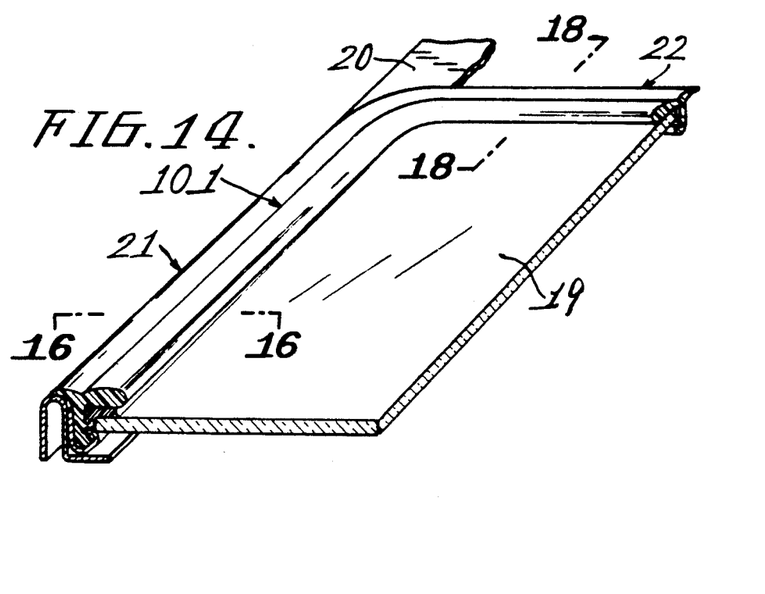
FIG. 14 is a perspective view showing a part of the front glass molding of the second embodiment mounted between a body panel and a glass panel.

The molding body 101 in this second embodiment is assembled in such a manner that the lower engaging portion 9 of the main molding 102 is engaged with the engaging piece 116 of the holder 104 as shown in FIG. 13. The insertion projection 111 of the auxiliary molding 3 is inserted into the concave insertion recess 110 of the main molding 102, and the upper engaging portion 108 of the main molding 102 is engaged with the engaging dent 113 of the auxiliary molding 103. At the left and right side sections 21, 21 of the molding shown in FIGS. 16 and 17, a plurality of holder sections can be attached by their abutting faces 117 to the wall 24 of the body panel 20 in either a spaced apart or contiguous relationship. The lower engaging portion 109 of the main molding 102 is engaged with the engaging piece 116 of the holder 104 to fix the main molding 102 to the holder 104. The insertion projection 111 of the auxiliary molding 103 is inserted in the concave insertion recess 110 of the main molding 102, such that the molding body 101 is fixed, together with the glass panel 19, to the body panel 20. In the upper section 22 between the corner sections 23, 23 of the molding as shown in FIG. 18, the main molding 102 is mounted to each of the holder sections attached respectively on the wall 24 of the body panel 20, and an end of the glass panel 19 is held by the lower face of the head 105 of the main molding 102, whereby the molding body 101 is fixed integrally with the glass panel 19 by an adhesive 118 without inserting the auxiliary molding 103.

Figure 16:
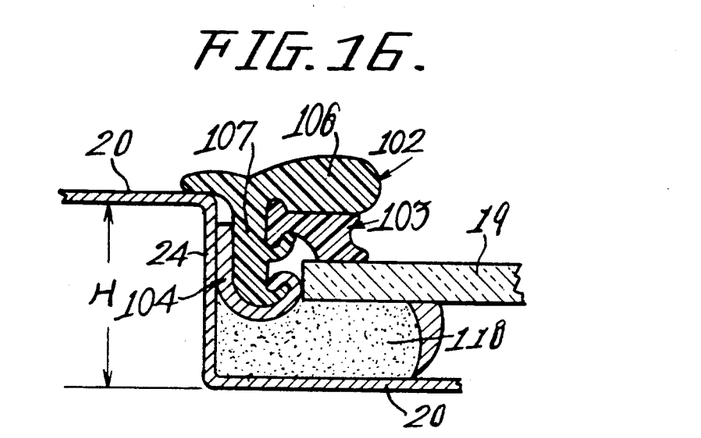
FIG. 16 is a vertical cross-sectional side view of the side section of the molding of the second embodiment, taken along line 8—8 in FIG. 1 or 16—16 in FIG. 14, showing a mounting arrangement utilized when the height of the perpendicular wall forming the opening of the body panel is large.
Figure 17:
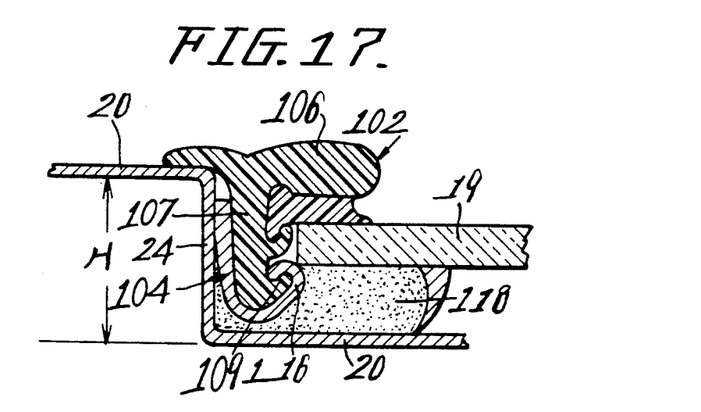
FIG. 17 is a vertical cross-sectional side view of the side section of the molding of the second embodiment, taken along line 8—8 in FIG. 1 or 16—16 in FIG. 14, showing a mounting arrangement utilized when the height of the perpendicular wall forming the opening of the body panel is small.
Figure 18:
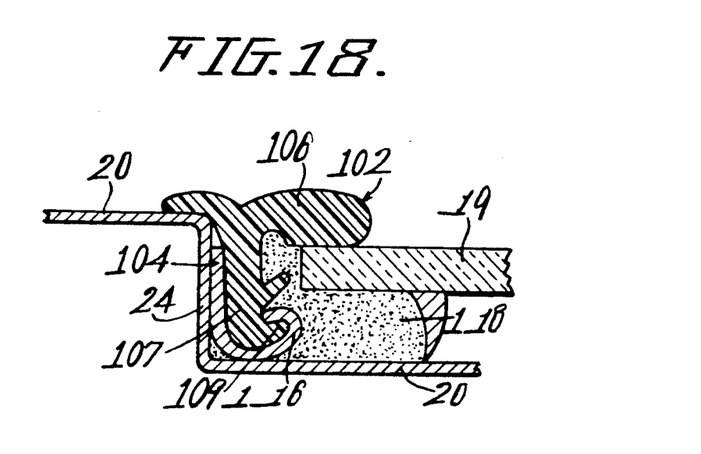
FIG. 18 is a vertical cross-sectional side view of the upper section of the molding part of the second embodiment, taken along line 18—18 in FIG. 1 or 7—7 in FIG. 14.

FIG. 16 shown an example in which the molding body 101 is mounted to the wall 24 of the body panel 20 which has a relatively large height H, while FIG. 17 shows an example in which the height H is relatively small.

In the molding body 101 in this second embodiment, as the holder 104, for preventing peeling of the paint caused by friction between the abutting face of the body panel 20 and the main molding 102, does not extending continuously along the full outer periphery of the left and right side sections 21, 21 and the upper section 22 of the molding, it is very economical. As an upper end of this holder 104 is not exposed outwardly, the molding has a more pleasing external appearance and can be formed of metal. In addition, the molding body 101 can be mounted to various walls 24 of body panels 20 having different heights H by adjusting the mounting position of the holder 104 relative to the wall 24.

While the preferred embodiment of the present invention have been shown and described in details, it will be understood that these embodiments are for illustration purposes only and are not to be taken as limiting the invention, this being defined in the appended claims.

I claim:

1. A molding for mounting a front glass panel to a wall of a body panel of a vehicle, comprising:
   an elongated main molding including a head adapted to overlie the glass panel, a leg extending downwardly and substantially perpendicularly from said head and having first and second opposing side faces, an upper engaging portion extending from a substantially central portion of said second side face of said leg, and a lower engaging portion having a hook-shape and curving upwardly from a lower end of said leg; and
   a holder having a first side face adapted to be attached to and in abutment with the wall of the body panel, a second side face which extends along said first side face of said leg of said main molding and directly abuts to said first side face of said leg of said main molding along the entire portion of said first side face of said leg of said main molding which faces said holder, and an engaging piece having a hook-shape and extending from a lower end of said second side face of said holder and curving upwardly along said second side face thereof, said engaging piece of said holder being engaged about said lower engaging portion of said main molding so as to attach said main molding to said holder.

2. A molding as recited in claim 1, wherein said holder comprises a plurality of substantially identical discrete holder sections attached in spaced apart relation along said main molding, and adapted to be attached in spaced apart relation along the wall of the body panel.

3. A molding as recited in claim 2, further comprising an auxiliary molding including, on one side face thereof, an insertion projection inserted between said upper engaging portion and said head of said main molding for attaching said auxiliary molding to said main molding, and, on another side face thereof opposite said one side face thereof, a water outlet channel.

4. A molding as recited in claim 1, wherein said main molding is formed as a continuous elongated piece which is adapted to extend about an upper periphery and opposing side peripheries of the glass panel, said main molding comprising an upper section adapted to extend along the upper periphery of the glass panel, and a pair of side sections respectively adapted to extend along the opposing side peripheries of the glass panel; and
   an auxiliary molding is provided along only said pair of side sections of said main molding, said auxiliary molding including, on one side face thereof, an insertion projection inserted between said upper engaging portion and said head of said main molding for attaching said auxiliary molding to said main molding, and, on another side face thereof opposite said one side face thereof, a water outlet channel.

5. A molding as recited in claim 4, wherein said holder comprises a plurality of substantially identical discrete holder sections attached in spaced apart relation along said main molding, and adapted to be attached in spaced apart relation along the wall of the body panel.

6. A molding as recited in claim 5, wherein said holder is formed of metal.

7. A molding as recited in claim 1, wherein said main molding is formed as a continuous elongated piece which is adapted to extend about an upper periphery and opposing side peripheries of the glass panel, said main molding comprising an upper section adapted to extend along the upper periphery of the glass panel, and a pair of side sections respectively adapted to extend along the opposing side peripheries of the glass panel; and said holder is formed as a continuous elongated piece attached with and extending along said main molding 8. A molding as recited in claim 7, wherein said holder includes, at its upper end, a contacting tongue adapted to contact a top end of the wall of the body panel, and, at its lower end, a bend adjusting portion which is adapted to be bent or cut in order to conform to different heights of the wall of the body panel.

9. A molding as recited in claim 8, wherein said holder is formed of synthetic resin.

10. A molding as recited in any one of claims 1-9, further comprising an adhesive tape attached to said first side face of said holder and adapted to adhere to the wall of the body panel, 11. A molding as recited in claim 1, wherein said holder further comprises a bend adjusting portion extending downwardly of said engaging piece.

* * * * *